Nov. 21, 1933.  J. H. GOSS  1,936,552
HOSE COUPLING
Filed Oct. 8, 1932
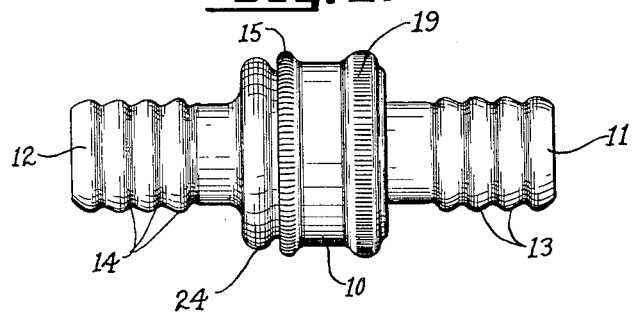
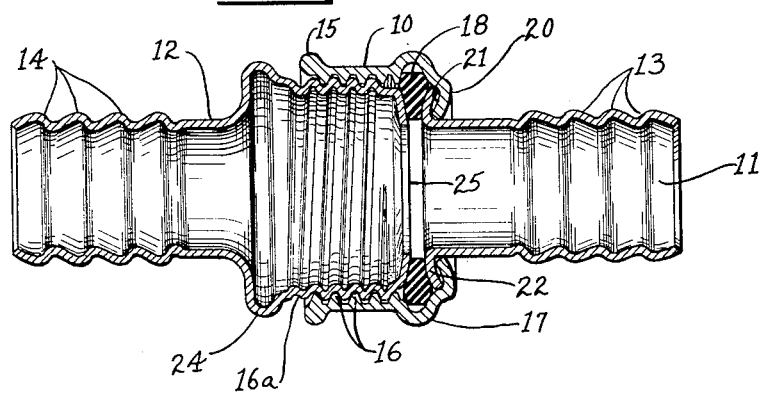
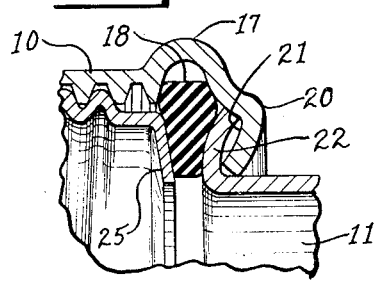
INVENTOR
John H. Goss
BY
ATTORNEY Patented Nov. 21, 1933

1,936,552

UNITED STATES PATENT OFFICE 1,936,552

HOSE COUPLING

John H. Goss, Waterbury, Conn., assignor to Scovill Manufacturing Company, Waterbury, Conn., a corporation of Connecticut Application October 8, 1932. Serial No. 636,827

2 Claims. (Cl. 285—120)

This invention relates to hose couplings, and more particularly to a swivel coupling for detachably connecting the ends of two sections of a rubber hose.

One object of this invention is to provide a hose coupling of the above nature having an improved form of swivel connection so formed as to provide a more effective seat for the packing washer.

A further object is to provide a hose coupling of the above nature which will be simple in construction, durable in use, inexpensive to manufacture, ornamental in appearance, very efficient in operation, and easily manipulated.

With these and other objects in view there has been illustrated on the accompanying drawing, one form in which the invention may be conveniently embodied in practice.

In the drawing:

Fig. 1 represents a side view in elevation of the improved swivel hose coupling.

Fig. 2 is a longitudinal sectional view of the same.

Fig. 3 is a detail fragmentary view of the sealing joint, showing the appearance of the packing washer when in compressed condition.

Referring now to the drawing in which like reference numerals denote corresponding parts throughout the several views, the improved hose coupling in general comprises three separate members as follows: a union 10, a swiveled hose engaging nipple 11, and a unitary coupling member and hose engaging nipple 12, said members 11 and 12 being held together by said union 10. The outer sections of each of the nipples 11 and 12 are provided with a series of inclined annular corrugations 13 and 14 so formed as to facilitate the entrance of the nipples 11 and 12 into the ends of a rubber hose (not shown), but making it difficult to thereafter withdraw them.

The forward open end of the union 10 is constructed with an out-turned annular rim 15, the outer surface of which is knurled to facilitate the manipulation thereof. The middle portion of the union 10 is tapped at 16 for engaging the threads on the enlarged rear end 16a of the member 12. Beyond the tapped section 16 the union 10 is provided with a hollow expanded bead 17 forming a seat for a standard packing washer 18, preferably formed of rubber. The outer surface of said bead 17 may also be knurled as at 19.

In order to provide a swivel connection between the union 10 and the nipple 11, the extremity of the union 10 adjacent said nipple 11 is preferably provided with a forwardly concave rim section 20 integral with and extending inwardly from the expanded bead 17. The domed section 20 forms a stepped seat 21 for loosely and rotatably receiving an outwardly formed rearwardly concave flange 22 integral with said nipple 11. It will be understood that the inclination of the concave rim section 20 and the concave flange 22 serves to reinforce the stiffness and strength of said parts.

By means of this construction a substantially smooth flush seat is provided against which the packing washer 18 is adapted to be pressed when the union 10 is tightened. This prevents the crowding effect which would otherwise cause the flange 22 to press into said packing washer 18 and cause injury thereto.

It will be understood that the rim section 20, being concaved forwardly, forms a double line sealing contact with the flange 22 of the nipple 11, thus producing an extremely efficient and strong swivel engagement.

The enlarged threaded section 16a of the member 12 has an expanded bead 24 formed at the forward end thereof and an inturned beveled flange 25 at its rear end.

Operation

In operation, the nipples 11 and 12 will be first forced into the adjacent ends of the two hose sections to be connected. The enlarged threaded section 16a of the nipple 12 will then be inserted into the union 10, and the two nipples 11 and 12 with the attached hose sections will be forcibly drawn together by the manual rotation of the union 10. As most clearly shown in Fig. 2, when the union 10 has been screwed into the position shown, the adjacent flanges 22 and 25 of the nipples 11 and 12 will be tightly compressed against the opposite faces of the packing washer 18, thus producing a very effective water-tight joint.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a hose coupling, an interiorly threaded metal union having an expanded hollow knurled bead formed at its apertured base end, the interior of said bead comprising a concave channel, the base of said union being outwardly formed to provide an interior seat, a hose engaging sheet metal nipple having an out-turned flange for rotatably fitting within said seat, a packing washer resting upon said nipple flange and union base, the inner part of said base seat being forwardly inclined, whereby said flanges will engage each other with a double line, and the inclination of said inner part serving to reinforce the stiffness and strength of said base seat.

2. In a hose connection, a union formed from sheet metal having an expanded curved bead formed at one end thereof, said bead forming a hollow groove for the reception of the outer section of a packing washer, said bead having an inwardly-extending forwardly-inclined rearwardly-offset flange, a hose engaging nipple for swivel engagement with said union having an out-turned rearwardly-inclined flange integral with the inner end thereof, said flanges forming a smooth substantially flush seat for said washer, the stiffness and strength of said flanges being reinforced by the inclination thereof.

JOHN H. GOSS.